Feb. 1, 1944. A. MORCH 2,340,765
ELECTRIC BATTERY CELL
Filed May 18, 1942

Inventor
Anthony Morch
By
John R. Baug
Attorney

Patented Feb. 1, 1944

2,340,765

UNITED STATES PATENT OFFICE 2,340,765

ELECTRIC BATTERY CELL

Anthony Morch, Brooklyn, N. Y.

Application May 18, 1942, Serial No. 443,473

4 Claims. (Cl. 320—3)

The invention relates to electric battery cells generally, and more particularly to the so-called primary or "dry" types thereof.

Heretofore, in the prior art to which this invention appertains, "dry" cells, or batteries of these cells, have had comparatively limited use and short life, being, as they were, intended primarily for intermittent operation, or for continuous operation where the current demand was small. The essential parts of any electric cell are two dissimilar electrodes, immersed in an electrolyte in a suitable container. With a dry cell, the container usually constitutes one of the electrodes, zinc being the metal generally employed for its makeup. The other of the electrodes is usually in the form of a strip or rod of carbon and is known as the cathode; the zinc container being called the anode; the cathode constituting the positive pole or circuit terminal and the anode the negative pole or circuit terminal of a cell. Until recently, it has been understood that cells of this class, as heretofore constituted, cannot be charged from an external electric current and, when depleted or exhausted, they have been discarded, or provided with new electrodes and new electrolyte when this is possible. The incapability of these cells to be recharged from an external electric current, after the manner of a secondary cell, or storage battery, is due to the character of the chemical action occurring therein; the distinction being that the reaction in a standard dry cell, between the electrolyte and the electrodes, cannot be reversed, as it can be in a secondary cell or storage battery. In the latter types of cells, chemical action is converted into electric energy by reaction and the energy so generated will pass to an external circuit just so long as this reaction (within certain limits) continues. With a diminution of the chemical reaction, and consequently of electric energy output, and the passing of an external electric energy through the cell, in the opposite direction to that of its output discharge, this latter input electric energy is transformed into chemical energy which may subsequently be converted back into electric energy. Dry cells provide simple and convenient sources of electric energy and may be connected together to form batteries, either in series or in parallel, but they have the disadvantages of low output and of being expensive where the consumption demand is great. With the growing need for conservation of resources, particularly chemicals and metals, the bringing into being of a rechargeable dry cell is of paramount importance, and it is to such end that the present invention is directed. However, it is to be noted that, in order to lengthen the effective life of dry cells, resort has been made to the placing of a depolarizing agent within the anode casing and about the cathode to neutralize the otherwise deleterious effect of hydrogen gas generated by the decomposition of the electrolyte, the agent supplying oxygen to combine with the hydrogen and thus producing water.

An object of the invention is to provide a dry cell, made to any standard or special size and with corresponding electrical energy output, that is capable of being revivified successively after periods of discharge and in like manner to the recharging of secondary or storage battery cells.

Another object of the invention has to do with the provision of a rechargeable dry cell that can be manufactured at a cost approximating that of a standard or special type of dry cell and which will have a prolonged period of life and usefulness comparable to that of the secondary or storage battery cell.

A further object of the invention is to provide an attachment, in the form of an adapter or connector, for rechargeable dry cells, particularly of the "flashlight" type and size, whereby a cell may be readily and easily recharged from a standard type of outlet of a low potential circuit, such as the lighting circuit of a motor vehicle.

With these and other objects and advantages of equal importance in view, the invention resides in the certain new and useful combination, construction, and arrangement of chemicals, elements and parts, as will be hereinafter more fully described, set forth in the appended claims, and illustrated in the accompanying drawing, in which:

Figure 1:
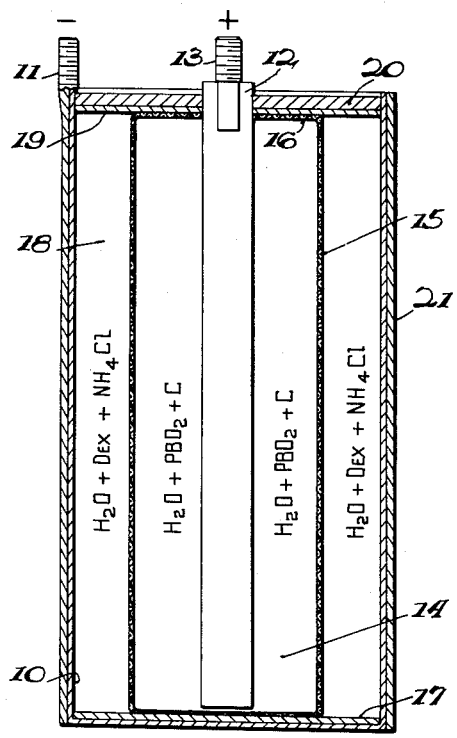
Figure 1 is a vertical section through a dry cell, in accordance with the invention.

Referring to the drawing, and more particularly to Figure 1, the dry cell, as illustrated therein, is comprised in a metal container 10, preferably made to standard form and from zinc, and, as usual, is open at its top end and provided with a circuit terminal 11 that rises from a point on the edge of its side wall. Centered within the container 10, is an electrode 12, constituting the cathode element, that is preferably in the form of a length of carbon rod, which has its top end projecting slightly above the open top of the container and provided with a circuit terminal 13.

Within the container 10, and surrounding the cathode 12, is a more or less of a pasty mixture 14, which is preferably composed of powdered graphite (C); lead dioxide-peroxide ($PbO_2$); and water ($H_2O$); that is confined within an absorbent or porous material 15, such as a cloth bag or the like, the bottom of which, together with the lower end of the electrode 12, is supported from contact with the bottom wall of the container by a coating or wafer 17, of an insulating material, such as a wax. Filling the remainder of the interior of the container 10, is an electrolyte 18, in the form of a gelatinized mixture composed of ammonium chloride ($NH_4Cl$); commercial dextrine (yellow preferred); and water ($H_2O$).

The mixture 14, for a cell of standard flashlight size, is preferably in proportions, as follows: powdered graphite, ¾ oz.; lead dioxide, ¼ oz.; and water (cold), ⅛ oz.; while those of the electrolyte 18, are: ammonium chloride, ⅛ oz.; dextrine, ¼ oz.; and water (hot), ¼ oz. For a large sized cell, say, a No. 6, the mixture 14 is made up in proportions, as follows: powdered graphite, ¾ lb.; lead dioxide, ¼ lb.; and water (cold), ¼ oz.; and those of the electrolyte 18: ammonium chloride, ¼ oz.; dextrine, 1 oz.; and water (hot), ½ pt.

With the cathode 12, and the two mixtures 14 and 18, in place within the container 10, the top end of the cloth bag 15 will be closed, as at 16, over the top of the mixture 14 and about the cathode 12; after which, the open end of the container will be sealed, first, with a coating or wafer 19, also of wax, and, secondly, with a coating wafer 20, of pitch or the like, applied directly over the coating or wafer 19. With the cell made up in this fashion, the container 10 will be enclosed, as usual, within a casing 21 that has the form of an open ended cylinder of cardboard or the like.

The small sized cell, as thus constructed and arranged, when fully charged, will rate 1½ volts, 2 amperes, while the No. 6 sized cell will rate 1½ volts, 20 amperes. As before stated, these cells may be connected together, either in series or in parallel, to form batteries for any given purpose and use, and, with four of the No. 6 sized cells connected in series, the battery so constituted may be substituted for the present storage battery, common to the operation of automotive vehicles, where the voltage requirement is 6 volts. Where the voltage requirement is, say 12 volts, then eight of the cells can be so connected. In either case, the cells will take a charging current from the generator usually forming a part of the ignition and lighting system of a motor vehicle. For convenience in use and handling, the required number of cells may be assembled within a suitable case (not shown) after the manner of the cell installation of the ordinary storage battery.

Figure 2:
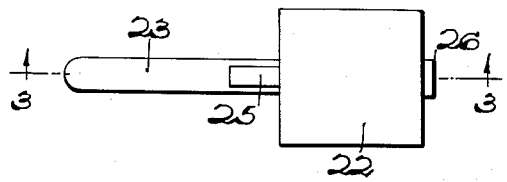
Figure 2 is a plan view of the recharging attachment.
Figure 3:
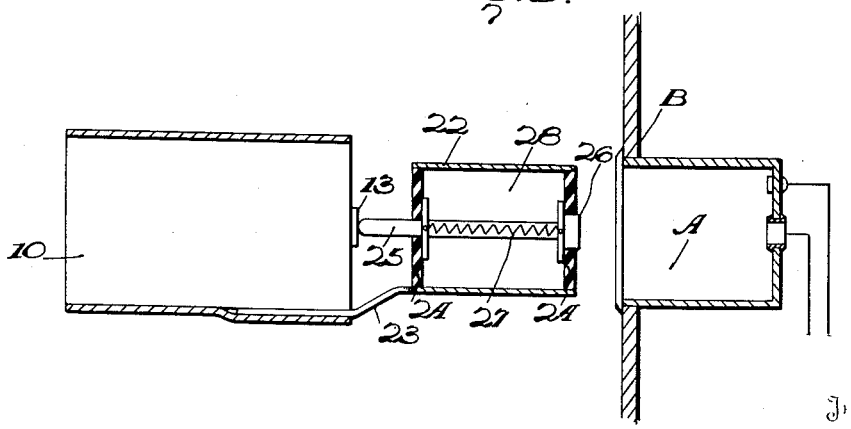
Figure 3 is a longitudinal section taken on the line 3—3 of Figure 2.

To facilitate the recharging of the flashlight sized cell, in accordance with the invention, and as shown in Figures 2 and 3, an attachment, in the form of an adaptor or connector, is provided, and it is comprised in a short length of metal tubing 22, of brass or copper, having a diameter to fit into a socket outlet, such as the dash-light socket A on the instrument panel B of a motor vehicle. Extending from a point on the edge of one of the tube 22 is a metal prong 23 that is to be inserted between the card-board casing 21 and the zinc container 10 of the cell, thus establishing electrical contact with the latter and, at the same time, acting to support the cell during a recharging operation. The opposite open ends of the tube 22 are each closed by a disc 24, formed from an insulating material, such as hard fiber or the like, in the centers of which are affixed metallic contacts 25 and 26; the outer contact 25 to be engaged by the terminal 13, of the cell cathode 12, when the cell is positioned on the prong 23, and the opposite or inner contact 26 with the central contact within the socket outlet A in the generator circuit. If the charging circuit potential is a 6 volt one, a resistance 27 is housed within the tube 22 between the contacts 25 and 26 and has an ohmic value to reduce the charging current potential to that of the cell output, or 1½ volts. The interior of the tube 22 is preferably filled with a suitable plastic material 28, of electric insulating character; the resistance 27 thus being embedded within the plastic material against possible disruption during use of the attachment.

Practical use of these coils has demonstrated that they will remain efficient over long periods of time and that they will be revivified back to normally rated output when subjected to a charging current of like potential value. Preferably, however, they are placed on charge prior to going "dead," i. e. when zero potential is indicated between the terminals 11 and 13. The advantages to be gained in the use of battery cells of this kind, over the so-called secondary or "wet" battery cells, are numerous and, it is is believed, entirely obvious, and, while certain anode, cathode, and chemical elements, have been specifically named herein, it will be understood that other elements, or combinations of elements, may be substituted therefor, in order to attain like results, without departing from the spirit of the invention, or its scope as claimed.

What I claim is:

1. In combination, a rechargeable "dry" electric cell and a circuit connector therefor, said connector being adapted for engagement in a standard type of outlet of a source of charging current to complete the circuit between the respective terminals of the cell and of said outlet, means carried by the connector to support the cell during the recharging period and acting to complete the circuit between an electrode of the cell and a terminal of said outlet, and a resistance carried by said connector to reduce the potential of the charging current to that of the output of the cell.

2. The combination as in claim 1, wherein said supporting means is constituted in an extension of the connector and is insertible between the anode body of the cell and the usual insulating casing encircling the latter to perform its supporting function.

3. A connector for rechargeable electric dry cells, comprising a hollow metal body adapted for engagement in a standard type of outlet of a source of charging current, an extension formed with said body for engagemet between the anode container of the cell and the usual insulating casing encircling the latter to support the cell directly from the outlet during the charging operation, the body and its extension forming one side of the circuit between a terminal of said outlet and the anode of the cell, and a contact centered within said body and insulated from it to complete the circuit between another terminal of said outlet and the cathode of said cell.

4. The connector as in claim claim 3, with a resistance embedded in an insulating material filling the interior of said body and in circuit with the last named contact.

ANTHONY MORCH.